INVENTOR
J. R. AVERY
BY Lucian C. Canepa
ATTORNEY

United States Patent Office 3,452,330

Patented June 24, 1969

3,452,330

ASYNCHRONOUS DATA TRANSMISSION SYSTEM WITH ERROR DETECTION AND RETRANSMISSION

John R. Avery, Howell Township, Monmouth County, N.J., assignor to Bell Telephone Laboratories, Incorporated, Murray Hill, N.J., a corporation of New York Filed July 25, 1967, Ser. No. 655,799
Int. Cl. G11b *13/00*
U.S. Cl. 340—172.5 3 Claims

ABSTRACT OF THE DISCLOSURE

A receiving data station in an asynchronous data communication system with error detection and retransmission capabilities detects an error in a received data character (utilizing standard error detecting techniques) and sends a retransmission request signal to a transmitting station. The transmitting station, upon receipt of the retransmission request signal, temporarily inhibits further transmission, times for a certain predetermined interval of time, and then retransmits certain of the previously transmitted characters including the character in which an error was detected. The receiving station, after having detected the erroneous character, counts and discards a predetermined number of the subsequently received characters and thereafter again commences to register the received characters. If the character initially found to be in error is retransmitted correctly, normal transmission is resumed. Detection and counting of received characters by the receiving station is accomplished by performing a "double check" or "double sample" on the start bit of each character.

BACKGROUND OF THE INVENTION

*Field of the invention*

This invention relates to data transmission systems and more particularly to asynchronous data transmission systems which include error detection and retransmission capabilities.

*Description of the prior art*

The use of error detection and retransmission in data transmission systems is well known in the prior art. (See, for example, H. C. A. van Duuren Patent 3,312,937, issued April 4, 1967). Most data transmission systems which utilize error detection and retransmission, however, are synchronous systems. As is well known, maintenance of synchronization between a transmitting and a receiving station in such systems is accomplished by utilizing synchronizing clocks. Thus, even though such systems experience noisy conditions on the transmitting channel, synchronization can generally be maintained if the synchronizing clocks are accurate. This is because the transmitted data characters play a relatively unimportant role in the maintenance of synchronization; therefore, the mutilation of the characters generally has little effect on the maintenance of synchronization.

The maintenance of synchronization between a transmitting and a receiving station in asynchronous systems, on the other hand, depends in large degree on the transmitted characters. In particular, it depends on the accurate detection of a received data character and specifically upon the detection of what is called the "start bit" of a received data character. Noisy conditions on the transmitting channel may cause the receiving data station to either falsely detect a start bit when one has not, in fact, been received or to fail to detect a valid start bit. Either case could result in the system losing synchronization. In asynchronous systems with error detection and retransmission capabilities, the possibility of this occurring during a period of detection and retransmission is increased since, presumably, such a period would normally be caused by noisy conditions on the channel.

SUMMARY OF THE INVENTION

It is an object of the present invention, in view of the above-described prior art systems and problems, to provide an asynchronous data transmission system having error detection and retransmission capabilities.

It is another object of the present invention to provide an asynchronous data transmission system comprising apparatus for maintaining synchronization during periods of error detection and retransmission.

It is still another object of the present invention to provide a novel and economical method of maintaining synchronization in an asynchronous data transmission system having error detection and retransmission capabilities.

These and other objects of the present invention are illustrated in a specific system embodiment which includes data stations each comprising error detection and retransmission equipment. Data is transmitted between the data stations in the form of fixed-length data characters. When the receiving data station detects an error in one of the received data characters, it sends a retransmission request signal to the transmitting station. The transmitting station, upon receipt of the retransmission request signal, temporarily prohibits further transmission, times over a certain predetermined interval of time, and then retransmits certain of the previously transmitted characters including the character in which an error was detected. The receiving data station, after having detected the erroneous character, counts and discards a predetermined number of the subsequently received characters and thereafter again commences to register any received characters. The number of characters counted and discarded is chosen so that the first character registered following the period of counting and discarding is the character initially found to be in error. If this character is retransmitted correctly, normal transmission is resumed.

Detection of a received character by a receiving station is accomplished by performing a "double check" or "double sample" on the start bit of each character. Assuming binary data transmission, the start bit may consist of either a mark or a space bit. If the start bit is a space bit, for example, then during idle periods when no data is being transmitted, a marking condition or level would exist on the data channel. In the binary case, the "double check" on the start bits consists of first of all detecting either a mark-to-space transition or a space-to-mark transition (depending on whether the start bit comprises a space bit or a mark bit, respectively) and thereafter sampling some fraction of a bit time later to determine if the bit which was apparently detected was, in fact, a bit. In this manner, even though a receiver detects impulse noise, for example, as being a valid mark-to-space or space-to-mark transition, if the subsequent check does not reveal the continued existence of a space or mark bit respectively, the receiver will treat the initial detection as being erroneous and will continue looking for a valid start bit.

The combined use of the timed interval before retransmission of data characters and the double check on the start bit of received data characters provides an efficient and economical method of maintaining accurate synchronization in asynchronous data transmission systems during periods of error detection and retransmission. The timed interval before retransmission is employed to allow time for any noice on the transmission channel (which presumably gave rise to the need for retransmission) to subside. As indicated above, "double checking" the start bit of each data character is utilized to prevent the receiver from falsely interpreting impulse noise as a valid start bit. This, in turn, insures that the receiver will maintain a more accurate count of the characters received after the detection of an erroneous character and therefore that the appropriate number of data characters will be discarded in anticipation of the receipt of the correct retransmitted data character.

Even if synchronization is lost during a period of error detection and retransmission say, for example, because noise prevented the detection of a valid start bit (e.g. by affecting the signal level of the center of the start bit so that the second check indicated the absence of the start bit), as long as an accurate count is kept of the characters received after the detection of an error, synchronization can usually be regained with the retransmitted characters following the timed interval. An accurate count can usually be maintained since even though the start bit of a character is not detected, it is likely that the character will contain some bit which is detected as being a start bit—therefore the character will be counted. If the characters received immediately after detection of an error are accurately counted and discarded even though the receiver is out of synchronization, then the subsequent occurrence of the timed interval will provide the receiver with time to prepare to commence "looking" for the start bit of the first character received after the interval and thus time to regain synchronization.

BRIEF DESCRIPTION OF THE DRAWING

A complete understanding of the present invention and of the above and other objects and advantages thereof may be gained from a consideration of the following detailed description of a specific illustrative embodiment presented hereinbelow in connection with the accompanying drawing, described as follows.

DETAILED DESCRIPTION

Figure 1:
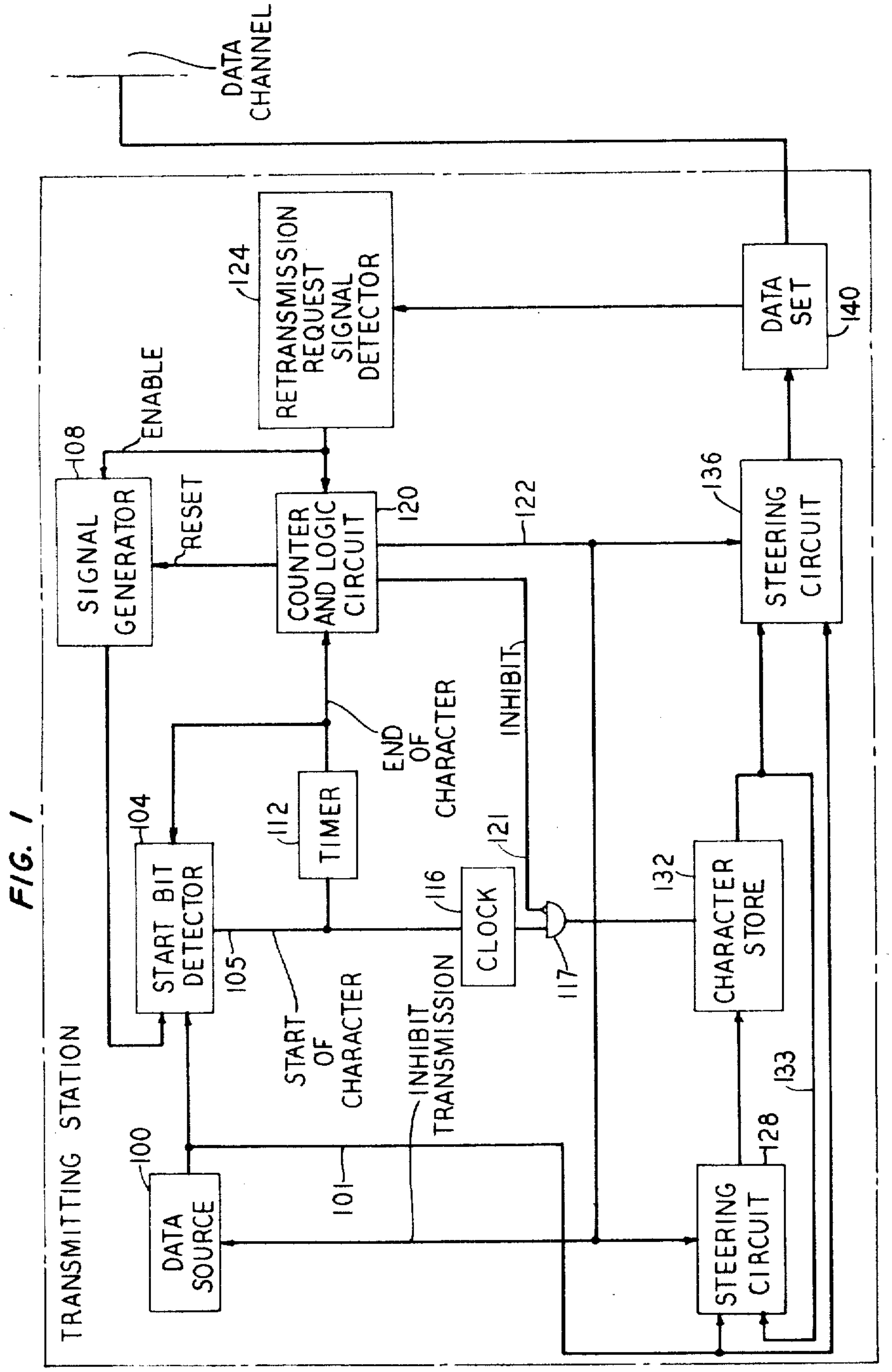
FIGS. 1 and 2, with FIG. 1 placed on the left of FIG. 2, show an asynchronous data transmission system made in accordance with the principles of the present invention.

Referring now to FIG. 1, there is shown a transmitting data station comprising a data source 100 connected to a start bit detector 104, steering circuits 128 and 136, and a counter and logic circuit 120. The start bit detector 104 is, in turn, connected to a signal generator 108, a timer 112, and a clock 116. The counter and logic circuit 120 is also connected to the signal generator 108, to the timer 112, to a character store 132 via an INHIBIT-AND gate 117, to the steering circuits 128 and 136, and to a retransmission request signal detector 124. The character store 132 is connected to the steering circuit 128, to the clock 116 via the INHIBIT-AND gate 117, and to the steering circuit 136. The retransmission request signal detector 124 is connected to the signal generator 108 and a data set 140. The data set 140 is connected to the steering circuit 136 and to a data channel which, in turn, is connected to a receiving data station (as shown in FIG. 2).

Figure 2:
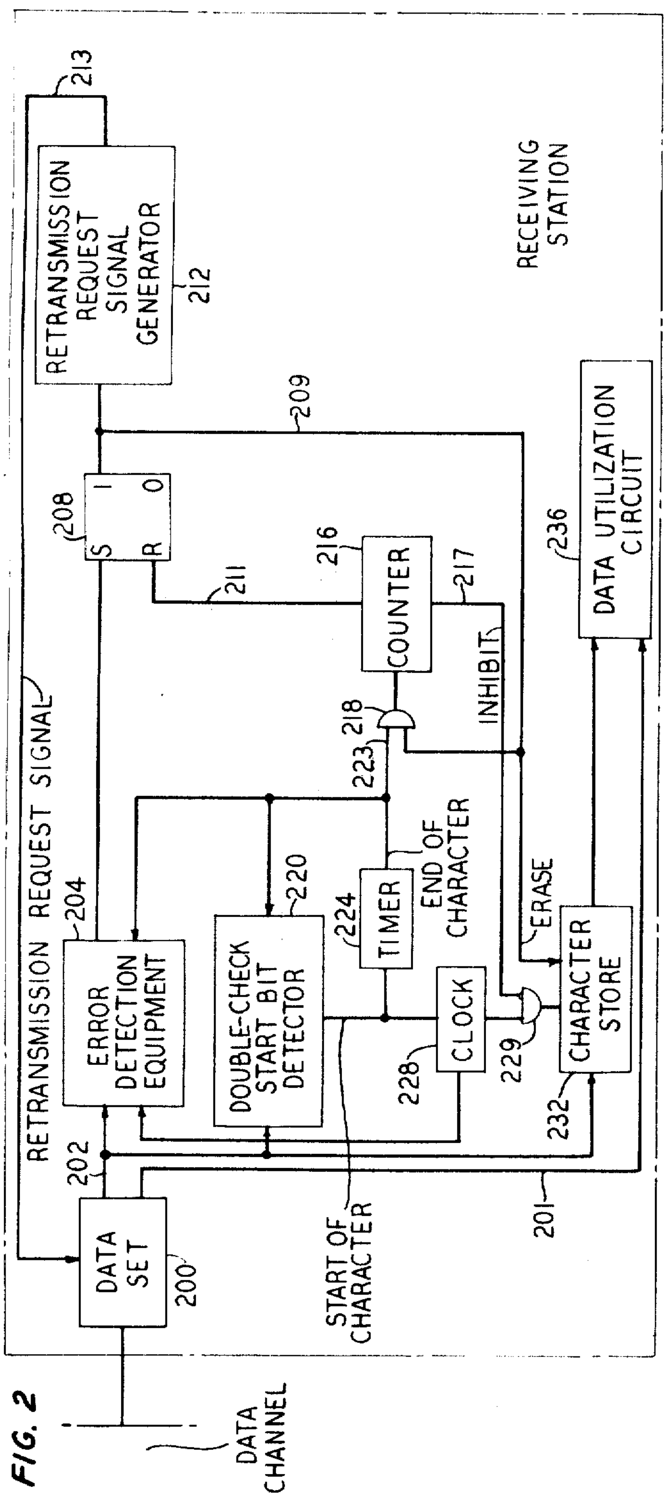

The receiving station of FIG. 2 comprises a data set 200 connected to error detection equipment 204, a double-check start bit detector 220, a character store 232, a data utilization circuit 236, and a retransmission request signal generator 212. The error detection equipment 204 is, in turn, connected to a flip-flop 208, a clock 228, and a timer 224. The double-check start bit detector 220 is connected to the clock 228 and to the timer 224. A counter 216 is connected to the flip-flop 208, to the timer 224 via an AND gate 218 and to the character store 232 via an INHIBIT-AND gate 229. The flip-flop 208 is connected to the retransmission request signal generator 212 and to the character store 232. The character store 232 is, in turn, connected to the data utilization circuit 236 and to the clock 228 via the INHIBIT-AND gate 229.

A connection between the transmitting station of FIG. 1 and the receiving station of FIG. 2 via the data channel is established utilizing current state of the art procedures. Such procedures typically involve the interchange of handshaking signals between data terminals to condition the terminals to commence communication. An illustrative procedure is set forth in T. L. Doktor-G. Parker-L. A. Weber-H. M. Zydney Patent 3,113,176, issued Dec. 3, 1963. The data source 100, for example, might initiate the call by transmitting a signal via lead 101 and the steering circuit 136 to the data set 140. The data set would then transmit a signal via the data channel to the data set 200 of FIG. 2 which would, in turn, signal the data utilization circuit 236, thereby informing the data utilization circuit 236 that the data source 100 desired to transmit information. Various signals necessary for the establishment of the connection as described in the above cited Doktor et al patent might then be interchanged between the transmitting station of FIG. 1 and the receiving station of FIG. 2. The data source 100 and the data utilization circuit 236 might illustratively be teletypewriters and operators, computers, etc. The data sets 140 and 200 might illustratively comprise transmission and receiving apparatus such as that disclosed in the Doktor et al. patent.

After the establishment of a connection, the transmitting station commences to transmit information to the receiving station in the form of encoded data characters each consisting of a certain fixed number of bits including, for example, information bits, error checking bit(s), a start bit which is used to identify the beginning of the character as discussed earlier, and stop bit(s). (Stop bits are used to identify the end of the character and to place the channel in a condition opposite that used for the start bit, e.g. in a marking condition if the start bit is a space bit.)

As the data source 100 applies the encoded data characters to the lead 101, the start bit detector 104 detects the start bit of the character and signals the timer 112 and the clock 116. The data characters are passed via the steering circuit 128 to the character store 132. The clock 116, in response to the signal from the start bit detector 104 that a character is emerging from the data source 100, generates a series of clock pulses and applies these pulses to the character store 132. Each series of pulses enables the character store 132 to register a character received from the steering circuit 128 and to apply certain of its (the character store's) contents to lead 133. (It may be advantageous to register only the information bits of character but this, of course, is discretionary.) As will be discussed later, if no clock pulses are received from the clock 116, the character store 132 will neither register characters nor apply any of its contents to lead 133. The characters from the data source 100 are also applied via lead 101 and the steering circuit 136 to the data set 140 where they are transmitted via a data channel to the data set 200 of the receiving station of FIG. 2.

The timer 112, in response to the signal from the start bit detector 104, commences to time for a period of time equal to the time required for the data source 100 to generate a data character. At the end of this period, which in effect indicates the end of the character just generated by the data source 100, the timer signals the start bit detector. The start bit detector 104 might advantageously comprise a flip-flop which assumes a set state upon receipt of a start bit from the data source 100 and a reset state upon receipt of an "end of character" signal from the timer 112. The resetting of the flip-flop would, of course, be for the purpose of preparing the flip-flop to detect the next character generated by the data source 100.

The character store 132 stores the transmitted data characters in anticipation of a possible request for retransmission received by the transmitting station from the receiving station. As will be discussed later, such requests may be received when the receiving station detects an error in one of the received data characters. The character store 132, having a predetermined capacity, stores all characters received from the data source 100 up to this capacity and thereafter, upon receipt of each additional character from the data source, applies the earliest received character then in the store to lead 133 and registers the new character. During normal transmission, the characters applied to lead 133 are, in effect, discarded since the lead 133 is not at this time connected to the output lead of the steering circuit 136 (nor of the steering circuit 128). The character store 132 might illustratively comprise a simple digital shift register.

The character store is of sufficient capacity so that upon receipt of a retransmission request signal by the transmitting station in response to the detection of an error by the receiving station, the stored character counterpart of the character found to be in error will not have been discarded by the character store. This, of course, depends on the transmission time of the data characters, the time necessary to detect an erroneous character, and the transmission time of retransmission request signals all of which may vary from one connection to another. The character store, of course, should be of sufficient capacity to handle the worst case situation which might be encountered in a connection.

Upon receipt of a data character from the data set 140, the data set 200 of the receiving station of FIG. 2 passes the character to the error detection equipment 204, the double-check start bit detector 220, and the character store 232, all via lead 202. The double-check start bit detector 220, upon detecting the start bit of each received character, signals the clock 228, thereby causing it to generate a series of clock pulses. These pulses are applied by the clock 228 to both the error detection equipment 204 and the character store 232 to enable these equipments to receive and register the characters applied via lead 202. The character store 232 might illustratively comprise a simple digital shift register including associated logic for storing the characters. The double-check start bit detector 220 also signals the timer 224 upon detection of a start bit, thereby enabling the timer to begin timing for a period of time equal to the time required for the data set 200 to apply a received data character to the lead 202. After timing over this period, the timer 224 applies a signal to lead 223, indicating the end of the character in question. If no errors are detected in the received characters, the character store 232 passes the charaters to the data utilization circuit 236.

Upon receipt of a character from the data set 200, the error detection equipment 204 checks the character for errors. This checking may be accomplished using any of the current state of the art error detecting techniques. For example, the error detection equipment may comprise simple parity checking equipment or more exotic multiple-error detecting equipment. If an error is detected, the error detection equipment 204 sets (or activates) the flip-flop 208 which normally resides in the reset (or inactive) condition. The flip-flop 208, in turn, signals the retransmission request signal generator 212 which generates a retransmission request signal and applies it via lead 213 to the data set 200. The retransmission request signal is then transmitted from the data set 200 via the data channel to the data set 140 of the transmitting station of FIG. 1 where it is applied to the retransmission request signal detector 124.

Upon receipt of the retransmission request signal, the retransmission request signal detector 124 enables the signal generator 108 to generate a series of pulses appropriately spaced to simulate character start bits. The retransmission request signal detector 124 also enables the counter and logic circuit 120 to count any pulses received from the timer 112 up to a predetermined count. In response to this enabling signal the counter and logic circuit 120 also applies a signal to lead 122 which causes the steering circuits 128 and 136 to disconnect their outputs from the input lead 101 and connect their outputs to the input lead 133. The signal applied to lead 122 also inhibits the further generation of data characters by the data source 100. Also, in response to the enabling signal from the retransmission request signal detector 124, the counter and logic circuit 120 commences to apply a signal via lead 121 to the INHIBIT-AND gate 117, thereby inhibiting the application of clock pulses from the clock 116 to the character store 132.

Upon receipt of each start bit pulse from the signal generator 108, the start bit detector 104 signals the timer 112 and the clock 116 just as in the case of receipt of data characters from the data source 100. In response to this signal, the timer 112, as before, commences to time for a period of time equal to the time required for the data source 100 to generate a data character. At the end of this period, the timer 112 signals the counter and logic circuit 120. This signal, as noted before, indicates the "end of character." Each of these signals received from the timer 112 causes the counter and logic circuit 120 to increase its count by one. After each generation of the "end of character" signal by the timer 112, the signal generator 108 generates another start bit pulse.

Upon reaching a first predetermined count, the counter and logic circuit 120 removes the inhibiting signal from the lead 121, thereby allowing clock pulses from the clock 116 to be applied to the character store 132. (As noted earlier, a series of clock pulses are generated by the clock 116 in response to each signal received from the start bit detector 104.) In response to each series of clock pulses, the character store 132 applies one of the previously transmitted characters stored therein to the steering circuits 136 and 128 via lead 133. The steering circuit 128 in turn reapplies this character to the character store 132 while the steering circuit 136 applies the character to the data set 140 to be transmitted via the data channel to the data set 200. In this manner, the counterpart characters of previously transmitted characters which are stored in the character store 132 are retransmitted to the receiving station and also reregistered in the character store. The reregistration, of course, is necessary in case some of the retransmitted characters are found to be in error.

After the counter and logic circuit 120 reaches a second predetermined count, it resets the signal generator thereby inhibiting the further generation of start bit pulses and preparing the generator for the receipt of the next retransmission request signal. Also at this time, the counter and logic circuit 120 removes the signal from the lead 122 thereby allowing the data source 100 to commence the generation of data characters and causing the steering circuits 128 and 136 to disconnect their outputs from the input lead 133 and connect their outputs to the input lead 101.

The number of start bit pulses generated by the signal generator 108 (and the count reached by the counter and logic circuit 120) must be sufficient to cause the retransmission of all characters stored in the character store 132. The number of start bit pulses generated must then equal the sum of the number of counts over which the inhibit signal is applied to lead 121 and the character capacity of the character store 132. For example, if the inhibit signal were applied to lead 121 until the counter and logic circuit 120 reached the count of four and if the capacity of the character store were five characters, then the number of start bit pulses generated by the signal generator 108 before being reset by the counter and logic circuit 120 would equal nine.

Inhibiting the application of clock pulses by the clock 116 to the character store 132, for example, for the first four counts registered by the counter and logic circuit 120 causes, in effect, the occurrence of an idle period on the data channel of four character lengths. As was mentioned earlier, the purpose of the generation of this idle period is to allow time for the noise on the data channel (which gave rise to the retransmission) to subside and for the receiver to regain synchronization if synchronization has been lost. At the conclusion of this idle period and in anticipation that the noise has subsided, the previously transmitted characters which are registered in the character store 132 are retransmitted to the receiving station as discussed above.

Again referring to FIG. 2, upon the detection of an error in a received character by the error detection equipment 204 and the setting (or activating) of the flip-flop 208, the flip-flop 208 applies a signal to a lead 209 thereby causing erasure of the erroneous character which is stored in the character store 232. The signal applied to lead 209 also coacts with each "end of character" signal (excluding, of course, the "end of character" signal of the character found to be in error) generated by the timer 224 (discussed earlier) to enable the AND gate 218, and thereby cause the counter 216 to increase its count by one.

The counter 216 is arranged to count a predetermined number of counts and during this time apply a signal via lead 217 to inhibit the application of clock pulses from the clock 228 to the character store 232, thereby preventing the registration of the received characters in the character store. This, in effect, causes the receiving station to discard a certain number of the data characters received immediately after the detection of an error. After the counter 216 reaches its predetermined count, it ceases to apply the inhibit signal to lead 217 and applies a signal via lead 211 to reset (or deactivate) the flip-flop 208. Thereafter, any received characters are registered in the character store 232 and then applied to the data utilization circuit 236 (assuming no new errors are detected).

The number of counts which the counter 216 is prearranged to register before removing the inhibit signal from lead 217 and applying the reset signal to lead 211 is equal to one less than the character capacity of the character store 132 of the transmitting station. By arranging the counter 216 to count this number of received characters before removing the inhibit signal from lead 217 and thus allowing the character store 232 to commence registering the received characters, the first character received after the removal of the inhibit signal is the retransmitted counterpart of the character in which an error was detected.

Upon completion of the retransmission cycle, normal transmission commences and continues until either another error is detected or until all transmission of data is completed.

Figure 3:
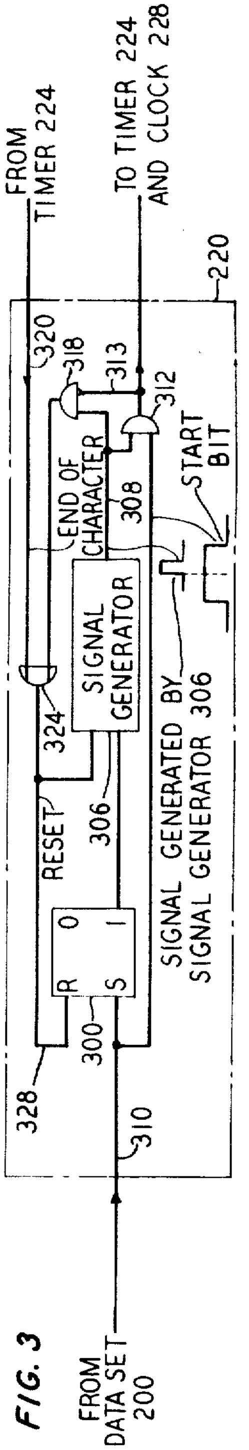
FIG. 3 shows one illustrative embodiment of the double check start bit detector 220 of FIG. 2.

FIG. 3 shows one illustrative embodiment of the double-check start bit detector 220 of FIG. 2. Start bits are applied by the receiving data set 200 to a lead 310. If the start bit is a space bit, for example, then the initial mark-to-space transition (assuming, of course, that there is a marking interval between characters) causes a flip-flop 300 to be set (or activated). The flip-flop, in turn, enables a signal generator 306 to generate a signal some fraction of a bit time later. (In FIG. 3, it is indicated that the leading edge of the signal is generated about one-half of a bit time after the setting of the flip-flop 300.) This signal, in conjunction with the existence of the space bit on lead 310, causes the enablement of an AND gate 312 which results in a signal being applied to the timer 224 and clock 228. The latter signal indicates that a valid character start bit has been received.

After a character has been received, the timer 224 applies an "end of character" signal via a lead 320 to an OR gate 324 which resets (or deactivates) the flip-flop 300 and the signal generator 306 in anticipation of receipt of the next character.

If impulse noise of duration shorter than that fraction of a bit time after which the signal generator 306 generates a signal in response to being enabled by the flip-flop 300 is received from the data set 200 over lead 310, the AND gate 312 will not be enabled since no signal will exist on lead 310 when the signal generator 306 applies its signal to the AND gate 312. Therefore, the timer 224 and the clock 228 will not be signaled that a character has been received. The impulse noise may, of course, set the flip-flop 300 thereby enabling the signal generator 306 to generate a signal which in conjunction with a "low" condition on lead 313 will cause the enablement of an INHIBIT-AND gate 318. This, in turn, will result in the enablement of the OR gate 324 and thus the resetting (or deactivating) of the flip-flop 300 and the pulse generator 306 in anticipation of the receipt of a valid start bit. The INHIBIT-AND gate 318 is a slow-acting gate such that even though a signal is applied by the signal generator 306 to lead 308 some short time before the AND gate 312 can place a "high" condition on lead 313, the INHIBIT-AND gate will not be enabled. Thus, when a start bit is received, the INHIBIT-AND gate will not be enabled.

Utilizing the double-check start bit detector 220, as previously discussed, provides a means for the receiving station to discriminate between a valid start bit and certain impulse noise. This, of course, is important to the receiving station maintaining synchronization.

It is noted that detailed circuit configuration for the units 108, 112, 116, 120, 124, 128, and 136 of FIG. 1, 212, 216, 224, and 228 of FIG. 2, and 306 of FIG. 3, have not been given herein because their arrangements are considered to be clearly within the skill of the art. Exemplary implementations for the units 100, 104, 132, and 140 of FIG. 1, and 200, 204, 220, 232, and 236 of FIG. 2 have already been given hereinabove.

Finally, it is to be understood that the above described arrangement is only illustrative of the applications of the principles of the present invention. Numerous other arrangements may be devised by those skilled in the art without departing from the spirit and scope of the invention. For example, the transmitting station of FIG. 1 could be equipped with the same apparatus as the receiving station of FIG. 2 and vice versa so that complete two-way transmission and error detection and retransmission could be effected. Furthermore, a multiplicity of such stations including equipment for interconnecting any two of the stations could be provided.

I claim:

1. An asynchronous data transmission system comprising a transmitting station and receiving station interconnected by a data communication channel, said transmitting station comprising a source of data characters each of which includes information bits and error checking bits all preceded by a start of character bit, transmitting and receiving means for transmitting said data characters to and for receiving retransmission request signals from said receiving station, a character storage means connected to said source and said transmitting and receiving means for storing a predetermined number of the data characters which shall have been most recently transmitted, retransmission request signal detection means connected to said transmitting and receiving means for detecting receipt of a retransmission request signal received from said receiving station, signal generating means connected to said detection means for generating a series of character start bit pulses in response to said detection means detecting receipt of a retransmission request signal said pulses being spaced at least one data character time apart, start bit detection means connected to said source and said signal generating means for generating a signal upon receipt of a start bit either from said source or from said signal generating means, timing means responsive to receipt of the signal from said start bit detection means for timing over an interval equal to one data character time and immediately thereafter generating a signal, a clock responsive to receipt of the signal from said start bit detection means for generating and applying a series of clock pulses to said character storage means, and logic means responsive to said retransmission request signal detection means detecting a retransmission request signal for temporarily inhibiting said source from applying data characters to said storage means and said transmitting and receiving means and for connecting said storage means to said transmitting and receiving means upon receipt of a retransmission request signal by said transmitting station and responsive to said timing means for inhibiting the application of said clock pulses to said storage means until receipt of a first predetermined number of signals from said timing means, wherein said clock pulses thereafter applied to said storage means cause said storage means to apply any stored characters to said transmitting and receiving means and to also reregister said characters and upon receipt of a second predetermined number of signals from said timing means for inhibiting the further generation of signals by said signal generating means, for resetting said signal generating means, and for disconnecting said storage means from said transmitting and receiving means.

2. A system as in claim 1 wherein said receiving station comprises transmitting and receiving means for receiving said data characters from and transmitting said retransmission request signal to said transmitting station, a data character utilization circuit, a character storage means connected to said transmitting and receiving means and said utilization circuit for temporarily storing received data characters and subsequently applying said characters to said utilization circuit, error detection equipment connected to said transmitting and receiving means for detecting errors in said data characters received from said transmitting station, bistable means connected to said error detection equipment and said character storage means for assuming an active state upon the detection of an error by said error detection means, and thereby causing the erasure of the character detected as being in error and stored in said storage means, signal generating means responsive to said bistable means assuming said active state for generating and applying said retransmission request signal to said transmitting and receiving means, a double-check start bit detection means connected to said transmitting and receiving means for generating a signal upon receipt of a start bit from said transmitting and receiving means, timing means responsive to receipt of the signal from said double-check start bit detection means for timing over an interval equal to one character time and immediately thereafter generating a signal, a clock responsive to receipt of the signal from said double-check start bit detection means for generating and applying a series of clock pulses to said character storage means, thereby enabling said storage means to store characters received from said transmitting and receiving means and to apply stored characters to said utilization circuit, counter and logic means connected to said timing means and said bistable means and responsive to the simultaneous receipt of the signals generated by said timing means and of an indication that said bistable means resides in said active condition for inhibiting the application of said clock pulses to said storage means until receipt of a first predetermined number of signals from said timing means thereby preventing storage of a certain number of data characters received after detection of an error and for deactivating said bistable means upon receipt of a second predetermined number of signals from said timing means.

3. A system as in claim 2 wherein said double check start bit detection means comprises a bistable means which is activated upon receipt of a start bit from said transmitting and receiving means, a signal generator responsive to said bistable means being activated for generating a pulse a certain fraction of a start bit time after the activation of said bistable means, first logic means for signaling said timing means and said clock upon the simultaneous receipt of a start bit from said transmitting and receiving means and a signal from said signal generator, second logic means for deactivating said bistable means upon receipt of a signal from said timing means or upon receipt of a signal from said signal generator if said first logic means is not generating a signal.

References Cited

UNITED STATES PATENTS

| | | | |
|---|---|---|---|
| 3,005,871 | 10/1961 | Rudolph | 178—26 |
| 3,312,937 | 4/1967 | Van Duuren | 340—146.1 |
| 3,223,974 | 12/1965 | Kok et al. | 340—146.1 |
| 3,324,460 | 6/1967 | Leonard et al. | 340—172.5 |
| 3,327,288 | 6/1967 | Webber | 340—146.1 |
| 2,970,189 | 1/1961 | Van Dalen et al. | 178—23 |
| 3,359,543 | 12/1967 | Corr et al. | 340—172.5 |

GARETH D. SHAW, *Primary Examiner.*

P. R. WOODS, *Assistant Examiner.*

U.S. Cl. X.R.

178—23.1; 340—146.1